Figure 1:
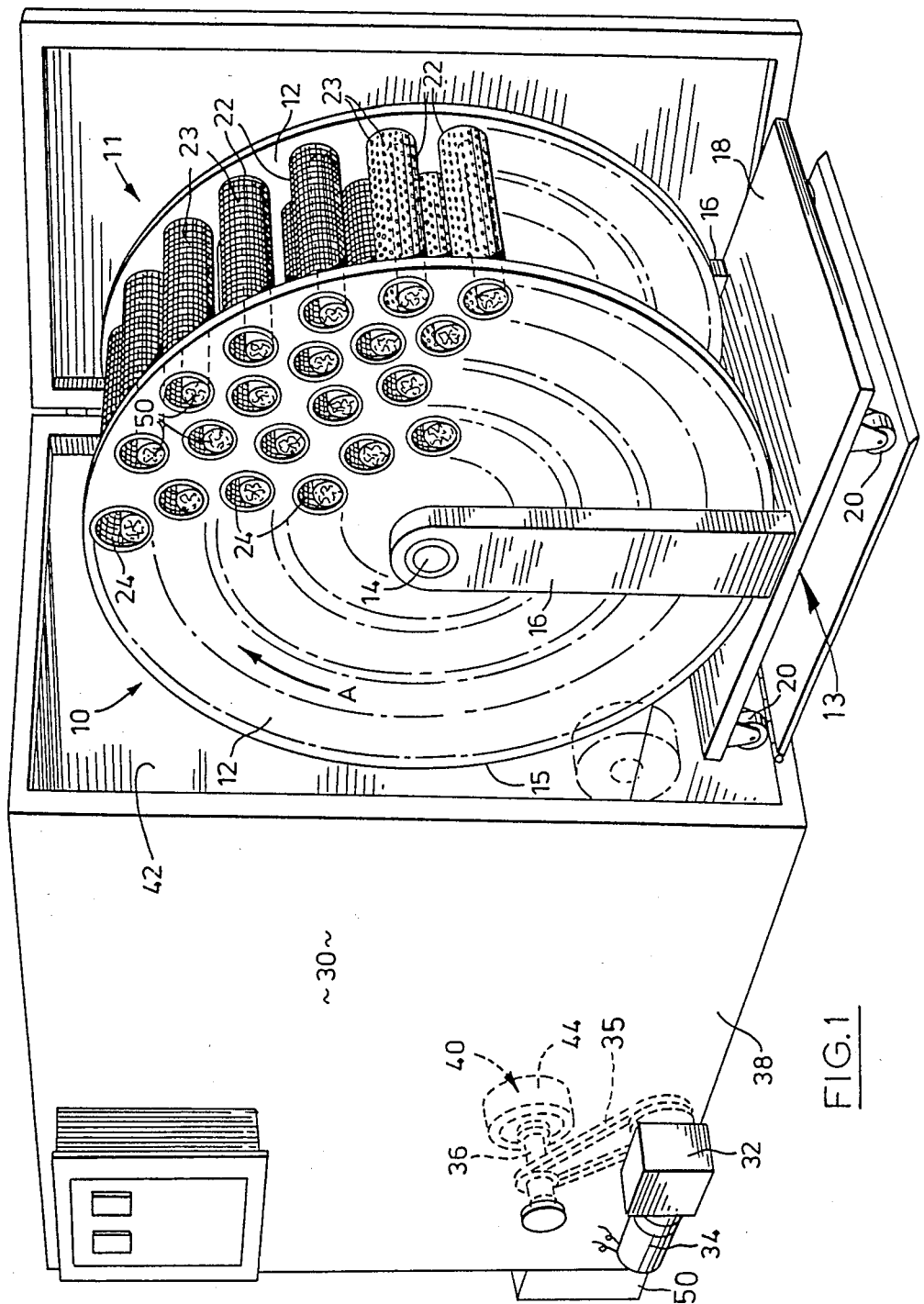

United States Patent [19]

Langen

[11] Patent Number: 4,549,476
[45] Date of Patent: Oct. 29, 1985

[54] SMOKE HOUSE COOKING

[76] Inventor: Jacobus J. Langen, 10 Ringway Crs., Rexdale, Ontario, Canada

[21] Appl. No.: 569,617

[22] Filed: Jan. 10, 1984

[51] Int. Cl.⁴ ............................................. A47J 37/04
[52] U.S. Cl. ..................................... 99/352; 99/427; 99/441; 99/450; 99/448; 99/479
[58] Field of Search ................ 99/427, 450, 441, 352, 99/477, 478, 479, 443 C, 443 R, 448; 426/235

[56] References Cited

U.S. PATENT DOCUMENTS

| | | | |
|---|---|---|---|
| 1,634,142 | 6/1927 | Hammond | 99/427 X |
| 2,004,775 | 6/1935 | Wright | 99/427 X |
| 2,579,827 | 12/1951 | Johnson | 99/441 X |
| 2,828,686 | 4/1958 | Nelems | 99/441 X |
| 3,316,831 | 5/1967 | Koland | 99/479 X |
| 4,355,569 | 10/1982 | Sage | 99/450 X |

Primary Examiner—Billy J. Wilhite
Attorney, Agent, or Firm—Fetherstonhaugh & Co.

[57] ABSTRACT

A meat support for supporting sausage in a smokehouse has a rotor mounted for rotation upon a support vehicle. The rotor has a plurality of horizontally extending pockets formed therein, each of which is proportioned to receive and support a sausage with its longitudinal axis horizontally oriented. The rotor is driven about its longitudinal axis such that the sausages which are located in the pockets of the rotor are caused to rotate about their own longitudinal axis. This rotation of the sausages when horizontally oriented serves to reduce moisture losses and to maintain a uniform moisture distribution throughout the sausage while it is cooked.

3 Claims, 1 Drawing Figure

SMOKE HOUSE COOKING

FIELD OF INVENTION

This invention relates to improvements in the cooking or smoking of meat such as sausages meat or ham and the like. In particular, this invention relates to an improved method and apparatus for cooking meat such as sausages, hams, beaf and poultry all of which are retained in a casing and are cooked or smoked in a smokehouse or the like.

PRIOR ART

Conventionally, meats which are stuffed into a casing are suspended from hangers in a smokehouse when being cooked or smoked. The sausages and the like hang vertically and remain static during the cooking operation. When the hung meat is heated, moisture in the form of juices and fats is released and tends to migrate under the influence of gravity to the lower end of the meat and eventually drips from the lower end of the meat into the smoke house. This loss of moisture is undesirable and the uneven distribution of moisture in the cooked product is also undesirable.

I have found that it is possible to overcome these difficulties by providing a mechanism which may be located in a smokehouse which will support the meat filled casings in a position in which their longitudinal extent is horizontally disposed and will cause rotation of the meat during the cooking operation. By supporting the meat filled casings so that they are horizontally elongated, I am able to reduce the moisture migration because the "head" of moisture is reduced and this serves to reduce the moisture losses. Furthermore, by supporting the meat filled casins so that they are horizontally oriented, I am able to maintain a uniform distribution of moisture along the length of the meat. In addition, by rotating the meat filled casings, I am able to obtain a substantially uniform moisture distribution across the thickness of the meat.

It is traditional to "hang" suasage during storage and this tradition has extended to all forms of storage of sausage including storage in smokehouses during cooking or smoking. While "hanging" of sausage does not greatly effect the moisture distribution in the sausage when the sausage is cooled subsequent to cooking, it does have a major effect on the moisture retention and moisture distribution during the cooking or smoking operation wherein the moisture and juices are activated by heating.

SUMMARY OF INVENTION

According to one aspect of the present invention, a smokehouse meat support for supporting longitudinally elongated meat member and the like comprises a rotor having a plurality of horizontally extending pockets, each proportioned to receive and support a meat member or the like in with its longitudinal extent horizontally oriented, support means supporting said rotor for rotation about a horizontal axis such that rotation of the rotor wll cause rotation of the meat members stored in said pockets with respect to the smokehouse environment thereby to retain moisture in the meat members and maintain a uniform moisture distribution within the meat members as they are cooked.

According to a further aspect of the present invention a method of cooking or smoking longitudinally elongated meat products such as sausage or the like in a hot air cooker chamber of a smoke house or the like comprising the steps of supporting a plurality of said products in an array in which their longitudinal extent is horizontally disposed in a spaced parallel relationship, rotating the entire array within said cooking chamber about a horizontal axis so as to rotate each product about its longitudinal axis to retain moisture and obtain a substantially uniform distribution throughout each meat product as it is cooked, heating the meat products as they are rotated.

PREFERRED EMBODIMENT

The invention will be more clearly understood after reference to the following detailed specification read in conjunction with the drawings wherein:

FIG. 1 is a pictorial side view of a meat support device in a smokehouse adapted to receive the meat support device for rotation therein.

The reference numeral 10 refers generally to a meat support device constructed in accordance with an embodiment of the present invention. The meat support device 10 consists of a rotor assembly 11 and a support vehicle 13. The rotor assembly 10 comprises a pair of circular end plates 12 which are mounted for rotation in the direction of the arrow A on a horizontally oriented support shaft 14. A plurality of hollow tubular members 22 have their opposite ends mounted in the end plates 12 and extend horizontally therebetween. The tubular members 22 may be in the form of metal tubes or wire mesh having perforations 23 in their side walls to permit the passage of smoke therethrough and to permit uniform heating of the meat product along the length thereof. The tubular members 22 have meat supporting means pockets 24 which open through the end plates 12 so that access to the pockets 24 may be gained through either end plate 12. The support shaft 14 is supported by a pair of support columns 16 which project upwardly from a base plate 18 of the support vehicle 13. The base plate 18 is supported by support wheels 20 which may be mounted to castor.

An electric motor 34 is located at one side of the smokehouse 30 and is coupled to a reduction gear box 32. The output shaft of the gear box 32 extends through the side wall 38 of the smokehouse and is connected by means of a belt 35 to shaft 36 which is located within the smokehouse. The shaft 36 has a drive wheel 40 at its outer end which is located within the smokehouse chamber 42. The drive wheel 40 has a rubber tire 44 mounted thereon which is arranged to bear against the peripheral edge 15 of one of the circular end plates 12. The rubber tire 44 provides frictional engagement with the peripheral edge of the end plate 12 such that when the motor 34 is activated, the rotor assembly 11 is rotatably driven about the support shaft 14 in the direction of the arrow A.

As illustrated in broken lines in FIG. 1 of the drawings, a longitudinally elongated sausage 50 may be located in each pocket 24 so that its longitudinal extent is horizontally oriented. It will be apparent that the diameter of the pockets 24 is selected so as to be larger than the diameter of the sausages which are to be cooked therein. Consequently, the sausages will contact the wall of their associated pocket along a narrow longitudinal strip. As a result of rotation of the rotor, the sausage may roll within its pocket and the point of contact will change continuously. When the rotor is rotated through 360°, the sausage meat will automatically rotate through 360° about its own axis even if the sausage is clamped or otherwise held against rotation relative to the tubular sleeve. It is this rotation of the meat through 360°, which is achieved without the use of a complex rotary spit mechanism, which ensures a good distribution of moisture across the width of the sausage while the horizontal orientation ensures a good distribution of moisture along the length of the sausage. Preferably, the rotor is driven continuously of a slow speed of one or two revolutions per minute. As previously indicated, the horizontal orientation also serves to reduce moisture losses due to the reduction in the "head" of moisture in the sausage during the cooking operation.

Hot "smoke" ladened air is supplied to the smokehouse chamber 42 by a source 50 which may be in any conventional form.

Various modifications of the structure of the invention will be apparent to those skilled in the art without departing from the scope of the invention wherein particular, it will be apparent that the tubular support members may be replaced by a series of narrow rods which extend transversely between the support plates 12 and define horizontally oriented pockets. Furthermore it will be apparent that the meat product may be clamped or otherwise secured with respect to the rotor to prevent free rotation thereof, without preventing rotation of the meat through 360° as a result of rotation of the rotor. It will also be apparent that the term "sausage" as used herein applies to any longitudinally elongated meat product such as casing enclosed hams, beef or poultry.

These and other modifications of the structure of the device of the present invention will be apparent to those skilled in the art.

I claim:

1. In a smokehouse having a cooking chamber formed therein, the improvement of;
   (a) a meat support adapted to fit within said chamber comprising;
      (I) a rotor having a plurality of horizontally extending pockets, each proportioned to receive and support a longitudinally elongated meat product with its longitudinal extent horizontally oriented, said rotor comprising a pair of oppositely disposed end members and a plurality of transversely extending support members, said transversely extending support members extending between said end members, said support members being arranged at fixed radially spaced intervals and at fixed circumferentially spaced intervals about said end members, one of said pockets being formed in each of said transverse support members, at least one of said end members having a peripheral driving edge extending thereabout;
      (II) support means supporting said rotor for rotation about a horizontal axis such that rotation of the rotor will cause rotation of the meat product stored therein with respect to the smoke house environment thereby to retain moisture in the meat product and maintain a uniform moisture distribution within the meat product as they are cooked,
   (b) drive motor means located external of said cooking chamber,
   (c) a drive wheel located in said cooking chamber, said drive wheel being arranged to engage said peripheral driving edge of said end member when said rotor is operably located in said housing,
   (d) power transmission means extending from said drive motor to said drive wheel located in said housing to rotatably drive said drive wheel and thereby drive said rotor when said drive motor means is activated.

2. In a smokehouse as claimed in claim 1 the further improvement wherein said support means is wheeled so as to be movable on its wheels into and out of said smokehouse in use.

3. A smokehouse meat support for supporting longitudinally elongated meat products such as sausages and the like in a smokehouse comprising:
   (a) a rotor having a horizontal axis of rotation, said rotor comprising; a pair of oppositely disposed end members and a plurality of transversely extending tubular members each of which has oppositely disposed ends mounted in one in each end member and opening therethrough to provide a plurality of horizontally extending pockets, some of said tubular support members being radially spaced from one another at fixed intervals on said end members and some of said tubular support members being circumferentially spaced from one another at fixed intervals on said end members such that said pockets occupy a substantial proportion of the space available between said end members, each of said pockets being proportioned to receive and support a meat product with its longitudinal extent horizontally oriented, said tubular members each having a side wall formed with a plurality of perforations opening therethrough which communicate between the pockets and the smokehouse environment in use, and
   (b) support means supporting said rotor for rotation about said horizontal axis of rotation such that rotation of the rotor will cause rotation of the meat products stored therein with respect to the smoke house environment thereby to retain moisture in the sausages and maintain a uniform moisture distribution within the meat products as they are cooked, said support means being wheeled so as to be movable on its wheels into and out of said smokehouse in use.

* * * * *